United States Patent
Nakamura

(10) Patent No.: US 10,076,959 B2
(45) Date of Patent: Sep. 18, 2018

(54) VEHICLE REGENERATIVE BRAKING CONTROL DEVICE

(71) Applicant: Nissan Motor Co., Ltd., Yokohama-shi, Kanagawa (JP)

(72) Inventor: Yohei Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 253 days.

(21) Appl. No.: 14/904,986

(22) PCT Filed: Jun. 16, 2014

(86) PCT No.: PCT/JP2014/065840
§ 371 (c)(1),
(2) Date: Jan. 14, 2016

(87) PCT Pub. No.: WO2015/015931
PCT Pub. Date: Feb. 5, 2015

(65) Prior Publication Data
US 2016/0152143 A1    Jun. 2, 2016

(30) Foreign Application Priority Data
Jul. 29, 2013  (JP) ................... 2013-156325

(51) Int. Cl.
*B60L 7/18*       (2006.01)
*B60L 7/14*       (2006.01)
(Continued)

(52) U.S. Cl.
CPC ............... *B60L 7/18* (2013.01); *B60L 7/14* (2013.01); *B60L 7/26* (2013.01); *B60L 11/1803* (2013.01);
(Continued)

(58) Field of Classification Search
None
See application file for complete search history.

(56) References Cited

U.S. PATENT DOCUMENTS

| 2002/0041167 A1 * | 4/2002 | Kitano | ................... B60K 6/48 318/3 |
| 2007/0013230 A1 * | 1/2007 | Yang   | ........................ B60L 7/26 303/152 |

(Continued)

FOREIGN PATENT DOCUMENTS

| JP | 6-153315 A     | 5/1994 |
| JP | 2010-200557 A  | 9/2010 |

*Primary Examiner* — Nicholas K Wiltey
(74) *Attorney, Agent, or Firm* — Global IP Counselors, LLP

(57) ABSTRACT

A vehicle regenerative braking control device is provided for a vehicle, which comprises wheels and a motor that brakes and drives the wheels. In this way, the vehicle travels by the motor driving the wheels, and brakes by applying a braking force to the wheels with a regenerative braking force of the motor. The vehicle regenerative braking control device comprises a vehicle controller configured to control the motor such that the regenerative braking force is to be decreased at a steady rate during a predetermined time before a state-of-charge of a battery used as a power source of the motor decreases to a level at which the regenerative braking force can no longer be generated as predetermined.

8 Claims, 3 Drawing Sheets

(51) Int. Cl.
*B60L 7/26* (2006.01)
*B60L 11/18* (2006.01)
*B60L 15/20* (2006.01)

(52) U.S. Cl.
CPC ....... B60L 11/1862 (2013.01); B60L 15/2009 (2013.01); *B60L 2240/423* (2013.01); *B60L 2240/80* (2013.01); *B60L 2250/26* (2013.01); *B60L 2270/145* (2013.01); *Y02T 10/645* (2013.01); *Y02T 10/7005* (2013.01); *Y02T 10/705* (2013.01); *Y02T 10/7044* (2013.01); *Y02T 10/7275* (2013.01)

(56) References Cited

U.S. PATENT DOCUMENTS

| | | | |
|---|---|---|---|
| 2013/0041565 A1* | 2/2013 | Fujiki | B60T 1/10 701/70 |
| 2013/0066493 A1* | 3/2013 | Martin | B60W 20/00 701/22 |
| 2013/0168168 A1* | 7/2013 | Takagi | B60K 6/22 180/65.245 |
| 2013/0168177 A1* | 7/2013 | Takagi | B60K 1/04 180/291 |
| 2013/0173107 A1 | 7/2013 | Kokon | |
| 2013/0218435 A1* | 8/2013 | Nakamura | B60L 7/14 701/70 |
| 2013/0320750 A1* | 12/2013 | Kim | B60T 7/042 303/6.01 |
| 2016/0159224 A1* | 6/2016 | Iida | B60T 1/10 303/3 |

* cited by examiner

[FIG. 2]

VEHICLE REGENERATIVE BRAKING CONTROL DEVICE

CROSS-REFERENCE TO RELATED APPLICATIONS

This application is a U.S. National stage application of International Application No. PCT/JP2014/065840, filed Jun. 16, 2014, which claims priority to Japanese Patent Application No. 2013-156325 filed in Japan on Jul. 29, 2013.

BACKGROUND

Field of the Invention

The present invention relates to a vehicle regenerative braking control device which comprises wheels that are braked/driven by a motor, which is capable of traveling by motor driving said wheels, and which is configured to cover for the braking force of the wheels with regenerative braking force of the motor.

Background Information

For example, as disclosed in Japanese Laid-Open Patent Application No. 1994-153315, braking of a vehicle can be summarized as a cooperative control in which a required target braking torque is obtained according to the driving state such as an accelerator release operation or a brake operation, and the running state surrounding the vehicle, during a coasting traveling in which the accelerator pedal is released or during a braking operation in which the accelerator pedal is released and the brake pedal is depressed, and in which said target braking torque is realized by combining the regenerative braking of the motor of the wheel drive system and frictional braking by a hydraulic brake or an electromagnetic brake.

The electric power that is generated by the motor by the regenerative braking is charged in a vehicle mounted battery, which is a power source of the motor, and thereafter used for motor driving. Upon the cooperative control described above, if the regenerative braking is preferentially utilized, and if the regenerative braking alone cannot achieve the target braking torque, it is common to employ a cooperative control method in which the target braking torque is realized by compensating for the shortage with frictional braking.

By configuring in the way described above, utilization of frictional braking can be suppressed to the minimum required amount by utilizing the regenerative braking as much as possible, having the maximum possible regenerative braking force determined by the charging state of the battery as the upper limit, and it is possible to minimize the frictional braking causing a loss of the kinetic energy of the vehicle as heat, while maximizing the amount of energy recovered to the battery, with the kinetic energy of the vehicle being converted into electric energy by regenerative braking. As a result, energy efficiency is improved, and fuel consumption rate as well as electricity consumption rate can be improved.

SUMMARY

However, in the conventional regenerative braking control described above, even during charging by regenerative braking, the battery power consumption is greater than the charging amount, so the battery charge level is gradually decreased; in the end, when a state of running out of electricity is reached in which regenerative braking force cannot be generated even if a generator load is applied to the motor, the following problems occur.

If regenerative braking force is no longer generated due to the battery being brought into such a state of running out of electricity, the vehicle deceleration rate is reduced by this loss amount of regenerative braking, and since the vehicle deceleration rate change is different from that of the driving state, a problem occurs in which discomfort is imparted to the driver.

At this time, although the cooperative control described above compensates for the loss amount of regenerative braking with frictional braking, this compensation occurs after the loss of regenerative braking force due to the running-out-of-electricity of the battery; therefore, this cooperative control cannot solve the problem of the discomfort described above.

Moreover, since the vehicle deceleration rate which has been reduced by the loss amount of regenerative braking will be returned to the original deceleration rate corresponding to the target braking torque when friction braking force is being generated by the cooperative control, a problem also occurs in which this becomes a cause of braking shock.

Based on the recognition of the fact that the problems described above occur due to regenerative braking force abruptly becoming unobtainable when entering a battery state-of-charge that generates these problems, an object of the present invention is to provide a vehicle regenerative braking control device that is improved so that the problem described above would not occur, by gradually reducing the regenerative braking force beforehand from a predetermined time immediately before entering said battery state-of-charge.

In order to achieve this object, the vehicle regenerative braking control device according to the present invention is configured in the following manner. First, to describe the vehicle which is a premise of the present invention, the vehicle is configured to comprise wheels that are braked/driven by a motor, to be capable of traveling by motor driving said wheels, and is configured to cover for the braking force of the wheels with regenerative braking force of the motor.

The present invention is such a vehicle regenerative braking control device, wherein the regenerative braking force is configured to be gradually decreased during a predetermined time immediately before the state-of-charge of the battery, which is a power source of the motor, is reduced to a level at which the regenerative braking force can no longer be generated as scheduled.

In the vehicle regenerative braking control device according to the present invention described above, since the regenerative braking force is gradually decreased beforehand during a predetermined time immediately before the battery state-of-charge is reduced to a level at which the regenerative braking force can no longer be generated as scheduled, a phenomenon in which regenerative braking force abruptly becomes unobtainable when the battery state-of-charge is reduced to the level described above can be prevented; therefore, discomfort due to a vehicle deceleration rate change (reduction) caused by said regenerative braking force loss phenomenon will not be imparted to the driver.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be described below based on the appended drawings.

First Embodiment

Figure 1:
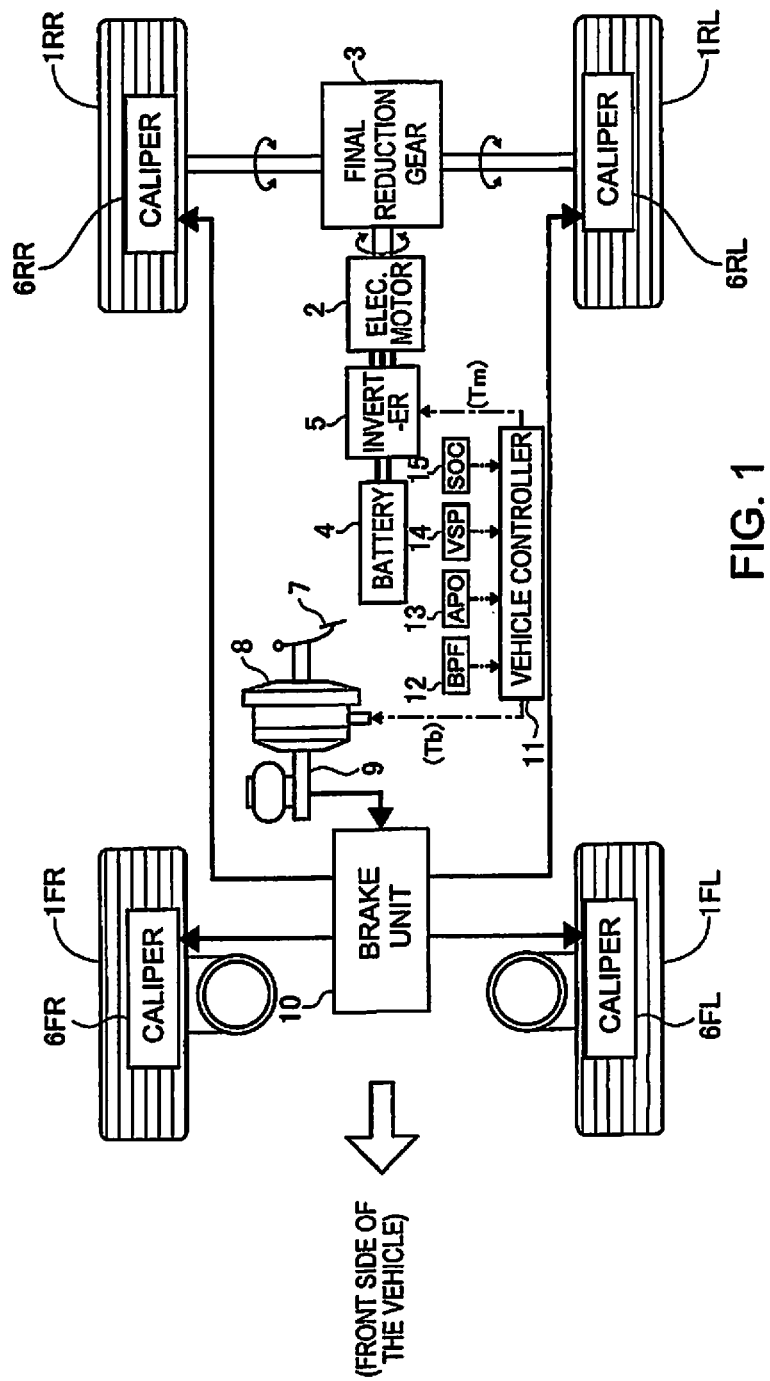
FIG. 1 is a schematic system view illustrating the overall control system according to a braking/driving force control system of an electric vehicle equipped with the regenerative braking control device according to one embodiment of the present invention.

FIG. 1 is a schematic system view illustrating the overall control system according to a braking/driving force control system of an electric vehicle equipped with the regenerative braking control device according to one embodiment of the present invention.

This electric vehicle comprises left and right front wheels 1FL, 1FR as well as left and right rear wheels 1RL, 1RR, and is configured to travel by driving the left and right rear wheels 1RL, 1RR with an electric motor 2 and can be steered by turning the left and right front wheels 1FL, 1FR. The electric motor 2 is drive coupled to the left and right rear wheels 1RL, 1RR via a final reduction gear 3 comprising a differential gear device, and shall be the power source common to these left and right rear wheels 1RL, 1RR.

The electric motor 2 is driven by the electric power provided by a battery 4 via an inverter 5. The inverter 5 converts direct current (DC) power of the battery 4 to alternating current (AC) power, supplies the alternating current (AC) power to the electric motor 2, and controls the drive force and the rotational direction of the electric motor 2 by controlling the current direction and the supplied power to the electric motor 2.

The electric motor 2 is a motor/generator that is capable of also functioning as a generator that normally motor drives the left and right rear wheels 1RL, 1RR as described above, but is also able to carry out regenerative braking of these left and right rear wheels 1RL, 1RR at a predetermined generator load during a braking operation. The power that the electric motor 2 generates during this regenerative braking is converted from alternating current (AC) to direct current (DC) by the inverter 5 for charging the battery 4, and thereafter used for driving the motor. With the above, the left and right rear wheels 1RL, 1RR are commonly braked/driven by the electric motor 2 via a final reduction gear 3 for driving or decelerating the vehicle.

When stopping the vehicle from a running state or when maintaining a stopped state, the object can be achieved by carrying out frictional braking which applies braking pressure on brake disks (not shown) that rotated with the left and right front wheels 1FL, 1FR and the left and right rear wheels 1RL, 1RR with calipers 6FL, 6FR, 6RL, 6RR.

In response to a depression force of a brake pedal 7 which a driver depresses, using an electric brake booster 8, a master cylinder 9 outputs a brake fluid pressure corresponding to a brake pedal depression force under boost to the calipers 6FL, 6FR, 6RL, 6RR via a brake unit 10. The brake unit 10 supplies the brake fluid pressure from the master cylinder 9 to the calipers 6FL, 6FR, 6RL, 6RR, and carries out frictional braking of the vehicle (wheels 1FL, 1FR, 1RL, 1RR) by the operation of the these calipers 6FL, 6FR, 6RL, 6RR.

The electric vehicle of FIG. 1 is equipped with a vehicle controller 11 for performing drive control and regenerative control of the electric motor 2 via the inverter 5, and the vehicle controller 11 further carries out a brake fluid pressure (friction braking force) control via the electric brake booster 8, in order to carry out the above-described cooperative control during regenerative control.

Accordingly, a signal from a brake pedal depression force sensor 12 that detects a brake pedal depression force BPF of the brake pedal 7, a signal from an accelerator position opening amount sensor 13 that detects an accelerator position opening amount APO, a signal from a vehicle speed sensor 14 that detects a vehicle speed VSP, and a signal from a battery state-of-charge sensor 15 that detects a state-of-charge SOC of the battery 4, are inputted to the vehicle controller 11.

Regenerative Braking Control

The vehicle controller 11 obtains a target motor torque Tm (drive torque is a positive value and regenerative torque is a negative value) of the electric motor 2 related to the left and right rear wheels 1RL, 1RR, by executing well-known calculations on the basis of the inputted information. This target motor torque Tm is instructed to the inverter 5, which controls the drive/regenerative control of the electric motor 2. The inverter 5 drives the left and right rear wheels 1RL, 1RR with the motor torque Tm by supplying corresponding DC→AC converted power from the battery 4 to the electric motor 2 in response to the target motor torque Tm (drive torque with a positive value), or, subjects the left and right rear wheels 1RL, 1RR to regenerative braking by applying a generator load corresponding to the target motor torque Tm (regenerative torque with a negative value) to the electric motor 2, converts the power that is generated by the electric motor 2 from AC→DC, and charges the same to the battery 4.

During the regenerative braking described above, the vehicle controller 11 obtains the target friction braking force Tb for the above-described cooperative control and supplies this target friction braking force Tb to the electric brake booster 8 at the same time. In response to the target friction braking force Tb, the electric brake booster 8 sets the brake fluid pressure from the master cylinder 9 to that which corresponds to the target friction braking force Tb, operates the calipers 6FL, 6FR, 6RL, 6RR with this brake fluid pressure, and carries out frictional braking of the wheels (1FL, 1FR, 1RL, 1RR).

The above is a normal control; the regenerative braking control during a running-out-of-electricity state of the battery, which is the aim of the present invention, will be described below. Upon the regenerative braking control during a running-out-of-electricity state of the battery, which is the aim of the present invention, in the case of the present embodiment, the vehicle controller 11 executes the control program of FIG. 2 and carries out the regenerative braking control during a running-out-of-electricity state of the battery, as illustrated in the time chart of FIG. 3.

Figure 3:
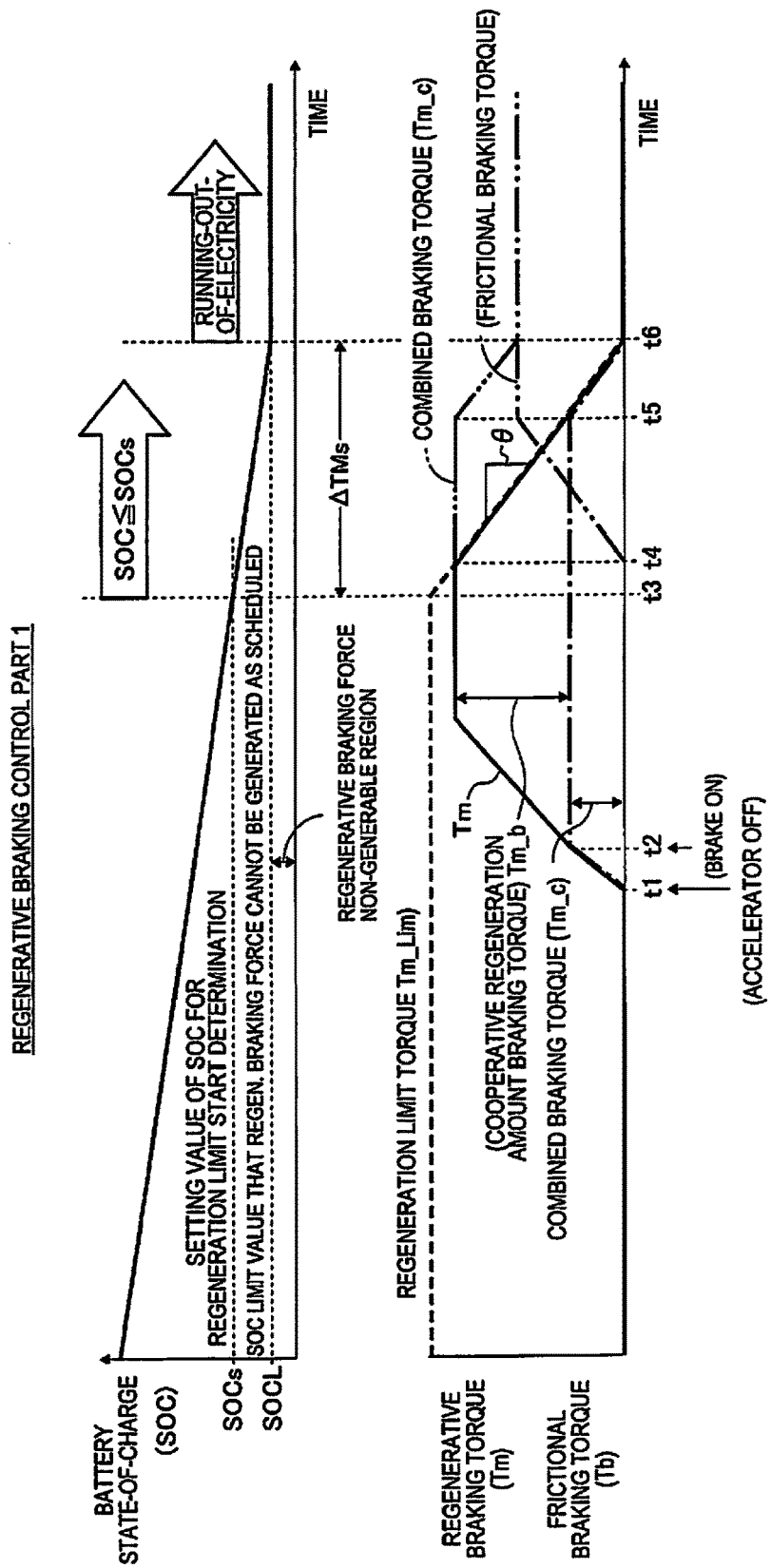
FIG. 3 is an operation time chart of the regenerative braking control by the control program of FIG. 2.

In step S11, whether or not the battery state-of-charge SOC is less than or equal to a setting value SOCs of the SOC for regeneration limit start determination is checked. The setting value SOCs will be described in detail based on FIG. 3. FIG. 3 is an operation time chart of a case in which, under a situation in which the battery state-of-charge SOC is gradually being reduced as illustrated, the accelerator pedal is released at a moment of time t1 indicated by "accelerator OFF," and the brake pedal 7 is depressed at a subsequent moment of time t2 indicated by "brake ON."

In addition, SOCL in FIG. 3 is an SOC limit value with which the regenerative braking force can no longer be generated as scheduled; in a low SOC region in which SOC≤SOCL, the battery 4 is brought into a state of running out of electricity at which the regenerative braking force can no longer be generated as scheduled, and this region is labeled as "regenerative braking force non-generable region" in FIG. 3. In the present invention, the setting value SOCs described above is set as a scheduled battery state-of-charge for determining a timing t3, which is a predetermined time ΔTMs before the moment of time t6 at which the battery state-of-charge SOC is reduced to the SOC limit value SOCL with which the regenerative braking force can no longer be generated as scheduled.

Figure 2:
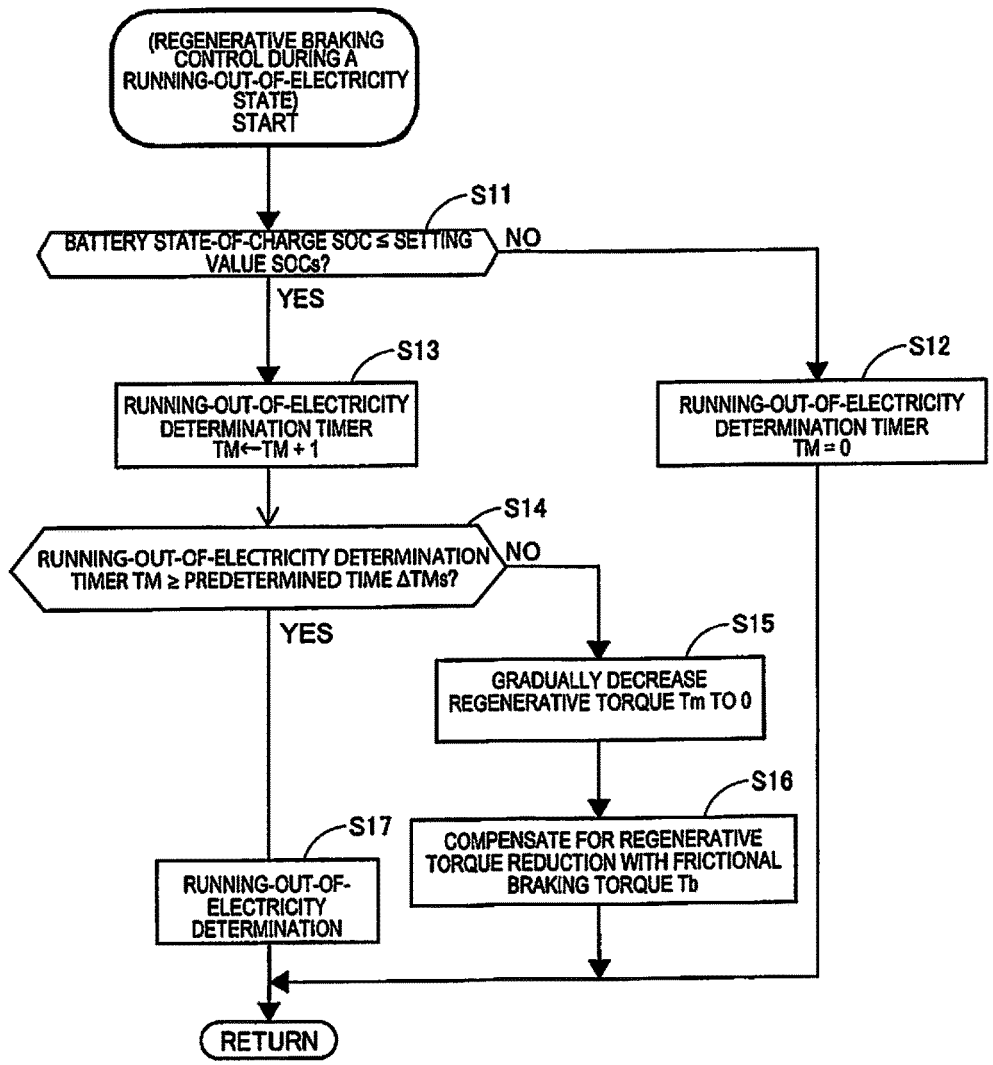
FIG. 2 is a flowchart illustrating a regenerative braking control program that is executed by the vehicle controller in FIG. 1, when the battery is brought into a state of running out of electricity.

If the battery state-of-charge SOC is determined not to be less than or equal to the setting value SOCs for the regeneration limit start determination (SOC>SOCs) in step S11, the control which is the aim of the present invention should not yet be started (the time is before the moment of time t3 in FIG. 3); therefore, a running-out-of-electricity determination timer TM is reset to 0 in step S12, and the control program of FIG. 2 is exited.

If the battery state-of-charge SOC is determined to be less than or equal to the setting value SOCs for the regeneration limit start determination (SOC≤SOCs) in step S11, the control which is the aim of the present invention should be started (the time has reached the moment t3 in FIG. 3); therefore, the control proceeds to step S13 and beyond. In step S13, the duration time during which (SOC≤SOCs) is determined in step S11, that is, the elapsed time from the moment of time t3 of FIG. 3, is measured by incrementing (increment) the running-out-of-electricity determination timer TM, which was reset to 0 in step S12.

In the subsequent step S14, whether or not the running-out-of-electricity determination timer TM value (the elapsed time from the moment of time t3 of FIG. 3, which is the duration time of the SOC≤SOCs state) is equal to or greater than the ΔTMs described above regarding FIG. 3 (whether or not the time has reached the moment of time t6 of FIG. 3) is checked. If it is determined to be between times during which TM<ΔTMs in step S14 (between moments of time t3-t6 of FIG. 3), the control proceeds to step S15 and step S16, sequentially; the regenerative torque Tm (refer to FIG. 1) is gradually decreased toward 0 in step S15, and the reduced amount of the regenerative torque in step S15 is compensated for with the frictional braking torque Tb (refer to FIG. 1) in step S16.

The gradual decreasing of the regenerative torque Tm toward 0 in step S15 is carried out in the following manner. A regeneration limit torque Tm_Lim, which is determined by the battery state-of-charge SOC, etc., as illustrated by the dotted line up to the moment of time t3 in FIG. 3, is gradually decreased after the moment of time t3 at which (SOC≤SOCs) is determined in FIG. 3, and is gradually decreased with a time change gradient θ with which Tm_Lim becomes 0 exactly at the moment of time t6 at which (TM=ΔTMs) is determined.

Then, from the moment of time t4 of FIG. 3 at which the regeneration limit torque Tm_Lim, which is gradually decreased in such a manner, matches the regenerative torque Tm, of the coast amount torque Tm_c and the cooperative regeneration amount braking torque Tm_b which together form the regenerative torque Tm, the cooperative regeneration amount braking torque Tm_b is gradually decreased so as to decline along Tm_Lim with a time change gradient θ, and from the moment of time t5, at which the cooperative regeneration amount braking torque Tm_b thereby becomes 0, the remaining coast amount torque Tm_c is also gradually decreased so as to decline along Tm_Lim with a time change gradient of θ, so that the regenerative torque Tm becomes 0 at the moment of time t6.

The above-described decrease gradient θ of the regenerative torque Tm (cooperative regeneration amount braking torque Tm_b and coast amount torque Tm_c) is determined by the predetermined time ΔTMs between the moments of time t3-t6 in FIG. 3; this predetermined time ΔTMs is preferably set to the minimum time required for the decrease gradient θ of the regenerative torque Tm (cooperative regeneration amount braking torque Tm_b and coast amount torque Tm_c) to not impart the discomfort described above to the driver.

In step S16, compensation for the reduced amount of the regenerative torque in step S15 by the frictional braking torque Tb is carried out in the following manner. During the time in which the cooperative regeneration amount braking torque Tm_b is gradually decreased so as to decline along Tm_Lim with a time change gradient θ between moments of time t4-t5, a frictional braking torque Tb that maintains a combined torque (Tm+Tb) at the value at the moment of time t4 by compensating for the amount of the gradual decreasing of the cooperative regeneration amount braking torque Tm_b, is generated as illustrated by the chain double-dashed line in FIG. 3.

However, after the moment of time t5, this frictional braking torque Tb is maintained at the value at the moment of time t5 as illustrated by the chain double-dashed line in FIG. 3 so that the combined torque (Tm+Tb) is thereby reduced following the gradual decreasing of the coast amount torque Tm_c of after the moment of time t5, with a time change gradient θ.

If it is determined in step S14 in FIG. 2 that the running-out-of-electricity determination timer TM value (the elapsed time from the moment of time t3 of FIG. 3, which is the duration time of the SOC≤SOCs state) is equal to or greater than the predetermined time ΔTMs (the time has reached the moment of time t6 of FIG. 3), the battery 4 is brought into a state of running out of electricity and the regenerative braking force can no longer be generated as scheduled; therefore, the control proceeds to step S17 to carry out a running-out-of-electricity determination, after which the control of FIG. 2 is exited.

Effects

According to the regenerative braking control of the above-described embodiment, since the regenerative braking torque Tm is configured to be gradually decreased beforehand during a predetermined time ΔTMs immediately before the battery state-of-charge SOC is reduced to a level SOCL (immediately before the moment of time t6 in FIG. 3) at which the regenerative braking force can no longer be generated as scheduled, a phenomenon in which regenerative braking torque Tm abruptly becomes unobtainable when the battery state-of-charge SOC is reduced to the level SOCL described above can be prevented; therefore, discomfort, in which the vehicle deceleration rate comprises a change (reduction) that is not related to the driver's operation caused by this regenerative braking force loss phenomenon, can be prevented.

In addition, when obtaining the above-described action and effects, since the regeneration limit torque Tm_Lim is gradually decreased toward 0 during the predetermined time ΔTMs described above, with a time change gradient θ that is determined by this predetermined time ΔTMs, from the time at which it is determined that the battery state-of-charge SOC has become equal to or less than the setting value SOCs, which is greater than the level SOCL described above (step S11), and the regenerative braking torque Tm is configured to be gradually decreased there along, the gradual decreasing control of the regenerative braking torque Tm described above becomes possible by simply gradually reducing the regenerative braking torque Tm_Lim, which already exists in the regenerative control; therefore the gradual decreasing control of the regenerative braking torque Tm becomes simple, and is also greatly advantageous in terms of cost.

Furthermore, since the present embodiment is configured to compensate for the gradual decreasing amount of the regenerative braking force Tm with the frictional braking torque Tb while the regenerative braking torque Tm is gradually decreased, the vehicle braking force can be maintained constant even while the regenerative braking torque Tm is gradually decreased, and the effects described above can be achieved without imparting discomfort in which the vehicle deceleration rate is changed.

In addition, since the present embodiment is configured so that the frictional braking torque Tb for compensating for the gradual decreasing amount of the regenerative braking force Tm is different from the gradual decreasing amount of the regenerative braking force Tm during the end portion of the gradual decreasing of the regenerative braking torque Tm (t5-t6 in FIG. 3), and maintained at the value at the start time (t5) of the end portion of the gradual decreasing (t5-t6 in FIG. 3), the braking force of the vehicle will be reduced at the running-out-of-electricity determination time t6, as is clear from the change in the combined braking torque (Tm+Tb) between t5-t6 in FIG. 3. The driver is able to intuitively know that the battery 4 has been brought to a state of running out of electricity from such a reduction in the braking force of the vehicle (combined braking torque Tm+Tb), and is able to reliably respond to the running-out-of-electricity state of the battery.

The present embodiment is configured to notify the driver of the running-out-of-electricity state of the battery 4 by a reduction in the combined braking torque (Tm+Tb) (reduction in the braking force of the vehicle) between t5-t6 in FIG. 3. However, instead of the above, a frictional braking torque Tb, with which an increasing (increase in the braking force of the vehicle) change of the combined braking torque (Tm+Tb) occurs between t5-t6 in FIG. 3, may be applied during the end portion of the gradual decreasing of the regenerative braking torque Tm (t5-t6 in FIG. 3).

Furthermore, in the present embodiment, the present invention was described regarding a case in which the vehicle is the electric vehicle illustrated in FIG. 1; however, the present invention is not limited to such an electric vehicle, and can be applied to any vehicle in which the wheels are braked/driven by an electric motor, and of course the same actions and effects can be exerted in any vehicle.

The invention claimed is:

1. A vehicle regenerative braking control device for a vehicle, which comprises wheels and a motor that brakes and drives the wheels for traveling by the motor driving the wheels, and for applying a braking force to the wheels with a regenerative braking force of the motor, the vehicle regenerative braking control device comprising:
a vehicle controller configured to monitor a state-of-charge of a battery and to control the motor so that the regenerative braking force is to be decreased at a steady rate during a predetermined time before the state-of-charge of the battery used as a power source of the motor decreases to a level at which the regenerative braking force can no longer be generated as predetermined.

2. The vehicle regenerative braking control device according to claim 1, wherein
the vehicle controller is configured to set a predetermined battery state-of-charge for determining a timing of the predetermined time before a moment of time at which the battery state-of-charge can no longer generate the regenerative braking force as predetermined, and
the regenerative braking force is decreased during the predetermined time from the time at which the battery state-of-charge is reduced to the predetermined battery state-of-charge.

3. The vehicle regenerative braking control device according to claim 2, wherein
the vehicle controller is configured to control frictional braking of the wheels to compensate for a decreasing amount of the regenerative braking force that occurs during the decreasing of the regenerative braking force at the steady rate.

4. The vehicle regenerative braking control device according to claim 3, wherein
the vehicle controller is configured to control the braking force of wheels by the frictional braking during an end portion of the decreasing of the regenerative braking force is different from the decreasing amount of the regenerative braking force so that a braking force of the vehicle is changed after the predetermined time has elapsed.

5. The vehicle regenerative braking control device according to claim 4, wherein
the vehicle controller is configured to maintain the braking force of the wheels by the frictional braking during the end portion of the decreasing of the regenerative braking force at a value at a start time of the end portion, so that a braking force of the vehicle is reduced after the predetermined time has elapsed.

6. The vehicle regenerative braking control device according to claim 1, wherein
the vehicle controller is configured to control frictional braking of the wheels to compensate for a decreasing amount of the regenerative braking force that occurs during the decreasing of the regenerative braking force at the steady rate.

7. The vehicle regenerative braking control device according to claim 6, wherein
the vehicle controller is configured to control the braking force of wheels by the frictional braking during an end portion of the decreasing of the regenerative braking force is different from the decreasing amount of the regenerative braking force so that a braking force of the vehicle is changed after the predetermined time has elapsed.

8. The vehicle regenerative braking control device according to claim 7, wherein
the vehicle controller is configured to maintain the braking force of the wheels by the frictional braking during the end portion of the decreasing of the regenerative braking force at a value at a start time of the end portion, so that a braking force of the vehicle is reduced after the predetermined time has elapsed.

* * * * *